(12) United States Patent
Song et al.

(10) Patent No.: US 9,769,842 B2
(45) Date of Patent: Sep. 19, 2017

(54) SIMULTANEOUS UPLINK TRANSMISSIONS IN DUAL CONNECTIVITY MODE (71) Applicant: Telefonaktiebolaget L M Ericsson (publ), Stockholm (SE)

(72) Inventors: Xinghua Song, Beijing (CN); Daniel Larsson, Vallentuna (SE); Shaohua Li, Beijing (CN); Imadur Rahman, Sollentuna (SE)

(73) Assignee: Telefonaktiebolgaet LM Ericsson (Publ), Stockholm (SE)

( * ) Notice: Subject to any disclaimer, the term of this patent is extended or adjusted under 35 U.S.C. 154(b) by 103 days.

(21) Appl. No.: 14/759,249

(22) PCT Filed: Jul. 10, 2013

(86) PCT No.: PCT/SE2013/050887
§ 371 (c)(1),
(2) Date: Jul. 6, 2015

(87) PCT Pub. No.: WO2014/109685
PCT Pub. Date: Jul. 17, 2014

(65) Prior Publication Data
US 2015/0351119 A1 Dec. 3, 2015

Related U.S. Application Data (60) Provisional application No. 61/750,920, filed on Jan. 10, 2013.

(51) Int. Cl.
*H04W 4/00* (2009.01)
*H04W 72/12* (2009.01)
(Continued)

(52) U.S. Cl.
CPC ..... *H04W 72/1268* (2013.01); *H04W 76/025* (2013.01); *H04L 5/001* (2013.01);
(Continued)

(58) Field of Classification Search
CPC ........... H04W 72/1268; H04W 76/025; H04W 72/1289; H04W 84/042; H04L 5/001; H04L 5/0035
(Continued)

(56) References Cited

U.S. PATENT DOCUMENTS 9,155,077 B2* 10/2015 Song .................. H04L 1/00
2012/0236804 A1* 9/2012 Lunttila .............. H04L 1/0027
370/329

(Continued)

OTHER PUBLICATIONS

U.S. Appl. No. 61/707,636—U.S. Pat. No. 9155077 to Song.*
(Continued)

*Primary Examiner* — Faisal Choudhury
(74) *Attorney, Agent, or Firm* — Patent Portfolio Builders, PLLC (57) ABSTRACT

The present disclosure relates to a method performed by a wireless terminal (2) operating with dual connectivity with a first node (4) and a second node (6). The method comprises receiving (100) information, from at least one of said nodes (4,6), associating (200) uplink transmissions to each node (4, 6) according to the received information, and applying (300) a set of node specific parameters to the uplink transmissions associated with each node (4, 6). The present disclosure also relates to a wireless terminal (2) configured to perform the method.

12 Claims, 9 Drawing Sheets (51) Int. Cl.
*H04W 76/02* (2009.01)
*H04W 84/04* (2009.01)
*H04L 5/00* (2006.01)

(52) U.S. Cl.
CPC ....... *H04L 5/0035* (2013.01); *H04W 72/1289* (2013.01); *H04W 84/042* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2013/0201841 | A1* | 8/2013 | Zhang | H04L 1/1607 370/252 |
| 2013/0265963 | A1* | 10/2013 | Suzuki | H04L 1/1861 370/329 |
| 2014/0092787 | A1* | 4/2014 | Han | H04W 52/0258 370/280 |
| 2014/0126403 | A1* | 5/2014 | Siomina | H04W 24/10 370/252 |
| 2014/0348090 | A1* | 11/2014 | Nguyen | H04W 72/042 370/329 |

OTHER PUBLICATIONS

PCT International Search Report for International application No. PCT/SE2013/050887, Dec. 13, 2013.
PCT Written Opinion of the International Searching Authority for International application No. PCT/SE2013/050887, Dec. 13, 2013.
3GPP TSG-RAN WG2 #81; Malta; Title: Small cell challenges and benefits of dual connectivity (Tdoc R2-130416), Jan. 28-Feb. 1, 2013.
3GPP TSG RAN WG1 Meeting #72; St. Julian's, Malta; Title: Physical layer aspects of dual connectivity (R1-130566), Jan. 28-Feb. 1, 2013.
3GPP TS 36.213 V11.1.0; 3rd Generation Partnership Project; Technical Specification Group Radio Access Network; Evolved Universal Terrestrial Radio Access (E-UTRA); Physical layer procedures (Release 11), Dec. 2012.
3GPP TR 36.932 V 12.0.0; 3rd Generation Partnership Project; Technical Specification Group Radio Access Network; Scenarios and Requirements for Small Cell Enhancements for E-UTRA and E-UTRAN (Release 12), Dec. 2012.

\* cited by examiner

SIMULTANEOUS UPLINK TRANSMISSIONS IN DUAL CONNECTIVITY MODE

PRIORITY

This nonprovisional application is a U.S. National Stage Filing under 35 U.S.C. §371 of International Patent Application Serial No. PCT/SE2013/050887 filed Jul. 10, 2013, and entitled "Simultaneous Uplink Transmissions in Dual Connectivity Mode" which claims priority to U.S. Provisional Patent Application No. 61/750,920 filed Jan. 10, 2013, both of which are hereby incorporated by reference in their entirety.

TECHNICAL FIELD

The technology relates to telecommunications, and particularly to the uplink transmissions in a dual connectivity mode.

BACKGROUND

In a typical cellular radio system, wireless terminals (also known as mobile stations and/or user equipment (UE)) communicate via a radio access network (RAN) to one or more core networks. The radio access network covers a geographical area which is divided into cell areas, with each cell area being served by a base station, e.g., a Radio Base Station (RBS), which in some networks may also be called, for example, a "NodeB" (Universal Mobile Telecommunications System (UMTS)) or "eNodeB" (Long Term Evolution (LTE)). A cell is a geographical area where radio coverage is provided by the radio base station equipment at a base station site. Each cell is identified by an identity within the local radio area, which identity is broadcasted in the cell by the RBS. The base stations communicate over the air interface operating on radio frequencies with the UEs within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The UMTS is a third generation mobile communication system, which evolved from the second generation (2G) Global System for Mobile Communications (GSM). The Universal Terrestrial Radio Access Network (UTRAN) is essentially a radio access network using wideband code division multiple access for user separation. In a forum known as the Third Generation Partnership Project (3GPP), telecommunications suppliers propose and agree upon standards for third generation networks and UTRAN specifically, and investigate enhanced data rate and radio capacity. The 3GPP has developed specifications for the Evolved UTRAN (E-UTRAN). The E-UTRAN comprises the LTE and System Architecture Evolution (SAE). LTE is a variant of a 3GPP radio access technology wherein the radio base station nodes are connected to a core network (via Access Gateways, or AGWs) rather than to RNCs. In general, in LTE the functions of the RNC node are distributed between the radio base stations nodes (eNodeBs in LTE) and AGWs. As such, the radio access network of the LTE system has an essentially "flat" architecture comprising radio base station nodes without reporting to RNC nodes.

Figure 1:
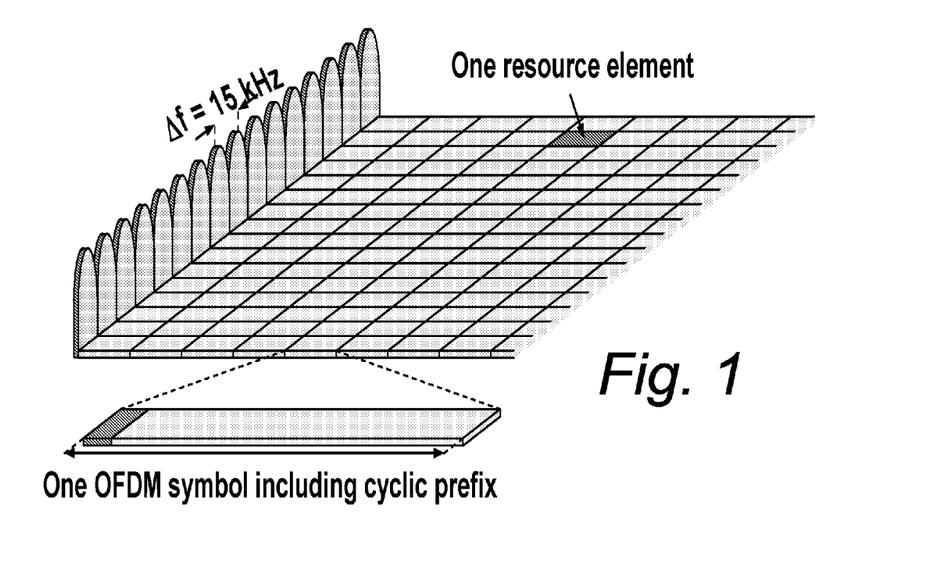
FIG. 1 is a diagrammatic view of a LTE downlink physical resource in the context of a resource grid.
Figure 2:
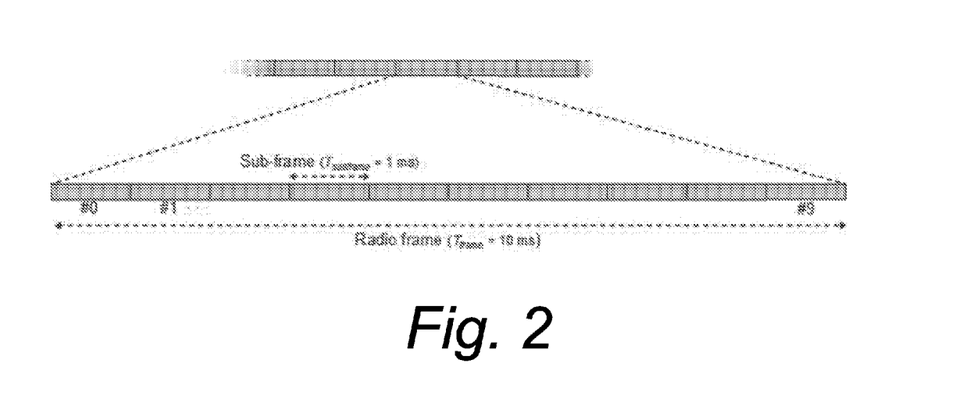
FIG. 2 is a diagrammatic view of a LTE downlink radio frame comprising ten equally-sized sub frames.

LTE uses Orthogonal Frequency-Division Multiplexing (OFDM) in the downlink and Discrete Fourier Transform (DFT)-spread OFDM in the uplink. FIG. 1 illustrates a basic LTE downlink physical resource in terms of a time-frequency grid, where each resource element corresponds to one OFDM subcarrier during one OFDM symbol interval. In the time domain, LTE downlink transmissions are organized into radio frames of 10 ms, each radio frame consisting of ten equally-sized sub frames of length $T_{subframe}=1$ ms, as illustrated in FIG. 2.

The resource allocation in LTE is typically described in terms of resource blocks (RB), where a resource block corresponds to one slot (0.5 ms) in the time domain and 12 contiguous subcarriers in the frequency domain. A pair of two adjacent resource blocks in the time direction (1.0 ms) is known as a resource block pair. Resource blocks are numbered in the frequency domain, starting with 0 from one end of the system bandwidth.

In the Frequency domain, LTE downlink uses a 15 KHz sub-carrier spacing. Thus, a resource block corresponds to one slot (0.5 ms) in the time domain and 12 contiguous sub-carriers in the frequency domain. A Resource Element (RE) is then defined as one sub-carrier in the frequency domain, and the duration of one OFDM symbol in the time domain.

Physical layer channels in the LTE uplink are provided by the Physical Random Access CHannel (PRACH); the Physical Uplink Shared CHannel (PUSCH); and the Physical Uplink Control CHannel (PUCCH). PUCCH transmissions are allocated specific frequency resources at the edges of the uplink bandwidth (e.g. multiples of 180 KHz in LTE depending on the system bandwidth). PUCCH is mainly used by the UE to transmit control information in the uplink, only in sub-frames in which the UE has not been allocated any RBs for PUSCH transmission. The control signaling may consist of a Hybrid Automatic Repeat Request (HARQ) feedback as a response to a downlink transmission, channel status reports (CSR), scheduling requests, Channel Quality Indicators (CQIs), etc.

On the other hand, PUSCH is mainly used for data transmissions. However, this channel is also used for data-associated control signaling (e.g. transport format indications, Multiple Input Multiple Output (MIMO) parameters, etc). This control information is crucial for processing the uplink data and is therefore transmitted together with that data.

The notion of virtual resource blocks (VRB) and physical resource blocks (PRB) has been introduced in LTE. The actual resource allocation to a UE is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain; thereby providing frequency diversity for data channel transmitted using these distributed VRBs.

Downlink transmissions are dynamically scheduled, e.g., in each sub frame the base station transmits control information about to which terminals data is transmitted and upon which resource blocks the data is transmitted, in the current downlink sub frame. This control signaling is typically transmitted in the first 1, 2, 3 or 4 OFDM symbols in each sub frame and the number n=1, 2, 3 or 4 is known as the Control Format Indicator (CFI) indicated by the physical CFI channel (PCFICH) transmitted in the first symbol of the control region. The control region also contains physical downlink control channels (PDCCH) and possibly also physical HARQ indication channels (PHICH) carrying Acknowledgement/Negative ACKnowledgement (ACK/NACK) for the uplink transmission.

Figure 3:
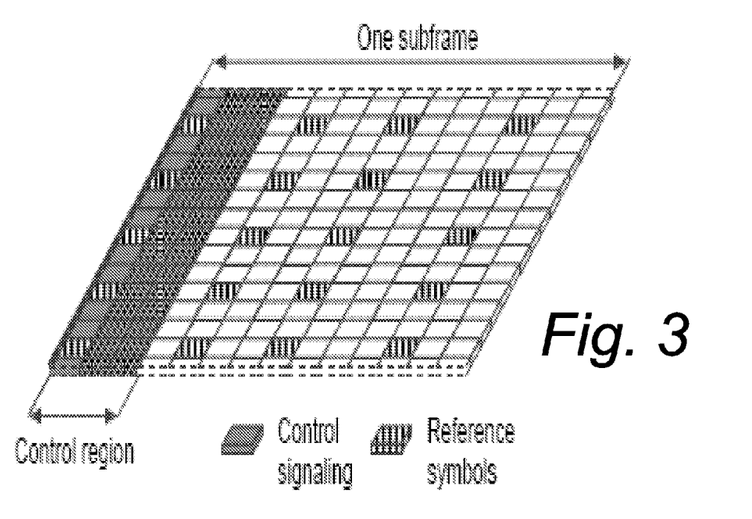
FIG. 3 is a diagrammatic view of a LTE downlink sub frame.

The downlink sub frame also contains common reference symbols (CRS), which are known to the receiver and used for coherent demodulation of e.g. the control information. A downlink system with CFI=3 OFDM symbols as control is illustrated in FIG. 3.

Figure 4:
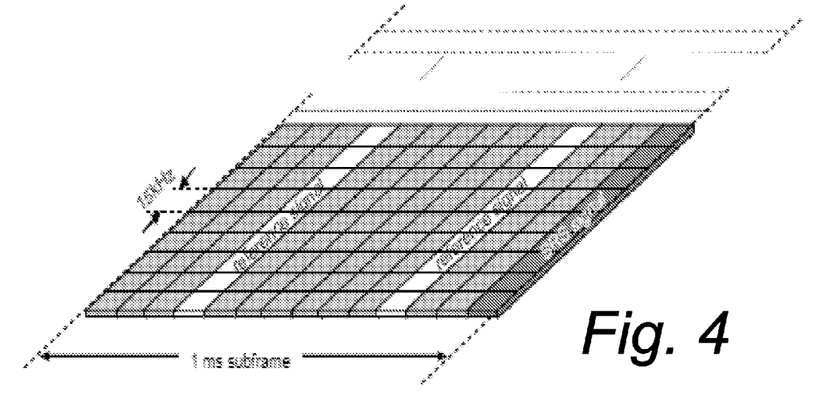
FIG. 4 is a diagrammatic view of a LTE uplink sub frame showing a SRS.
Figure 5:
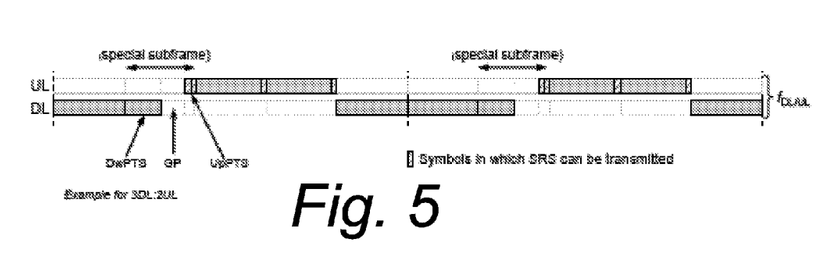
FIG. 5 is a diagrammatic view of a LTE uplink sub frame for TDD and showing SRSs.

FIG. 4 shows an example uplink transmission sub frame. In terms of the uplink (UL), Sounding Reference Signals (SRS) are known signals that are transmitted by UEs so that the eNodeB can estimate different uplink-channel properties. The sounding reference signals have time duration of a single OFDM symbol. These estimates may be used for uplink scheduling and link adaptation but also for downlink multiple antenna transmission, especially in case of Time Division Duplex (TDD) where the uplink and downlink use the same frequencies. The sounding reference signals are defined in 3GPP TS 36.211 "Evolved Universal Terrestrial Radio Access (E-UTRA); Physical channels and modulation", incorporated herein by reference in its entirety. The sounding reference signals may be transmitted in the last symbol of a 1 ms uplink sub frame. For the case of TDD, the sounding reference signals may also be transmitted in a special slot, Uplink Pilot Timeslot (UpPTS). The length of the UpPTS can be configured to be one or two symbols. FIG. 5 shows an example 10 ms radio frame for TDD, wherein in each of the two 5-slot sub frames the ratio of downlink (DL) slots to uplink (UL) slots is 3DL:2UL, and wherein up to eight symbols may be set aside for sounding reference signals. The configuration of SRS symbols, such as SRS bandwidth, SRS frequency domain position, SRS hopping pattern and SRS sub frame configuration are set semi-statically as a part of a Radio Resource Control (RRC) information element, as explained by 3GPP TS 36.331 "Evolved Universal Terrestrial Radio Access (E-UTRA); Radio Resource Control (RRC); Protocol specification", incorporated herein by reference in its entirety. Therein it is explained that the Information Element (IE) SoundingRS-UL-Config is used to specify the uplink SRS configuration for periodic and aperiodic sounding.

Figure 6:
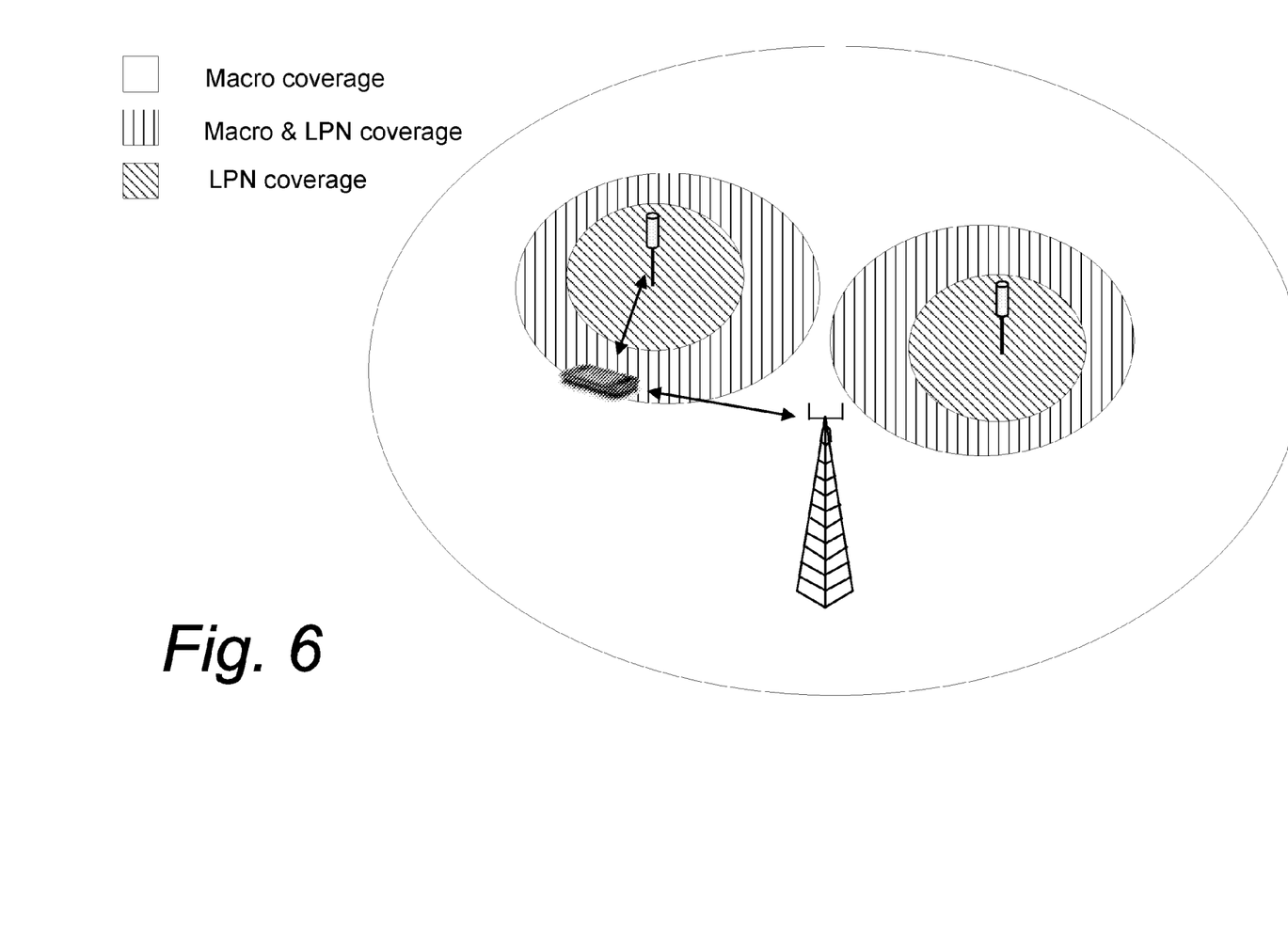
FIG. 6 is a diagrammatic view of a dual connectivity situation.

Dual connectivity is a feature defined from the UE perspective wherein the UE may simultaneously receive and transmit to at least two different network points. For example, FIG. 6 illustrates a dual connectivity scenario wherein a wireless terminal participates both in a connection with a macro radio base station node and a Low Power Node (LPN). Dual connectivity is one of the features that are considered for standardization within the umbrella work of small cell enhancements for LTE within 3GPP Rel-12.

Dual connectivity is defined for the case when the aggregated network points operate on the same or separate frequency. Each network point that the UE is aggregating may define a stand-alone cell or it may not define a stand-alone cell. It is further foreseen that from the UE perspective, the UE may apply some form of Time Division Multiplexing (TDM) scheme between the different network points that the UE is aggregating. This implies that the communication on the physical layer to and from the different aggregated network points may not be truly simultaneous.

Dual connectivity as a feature bears many similarities with carrier aggregation and Coordinated Multi Point (CoMP) transmissions. A differentiating factor is that dual connectivity is designed considering a relaxed backhaul and less stringent requirements on synchronization requirements between the network points, and thus is in contrast to carrier aggregation and CoMP wherein tight synchronization and a low-delay backhaul are assumed between connected network points.

Dual connectivity can be utilized in many ways. Two example ways, described in more detail below, are RRC diversity and Decoupled UL/DL.

Figure 7:
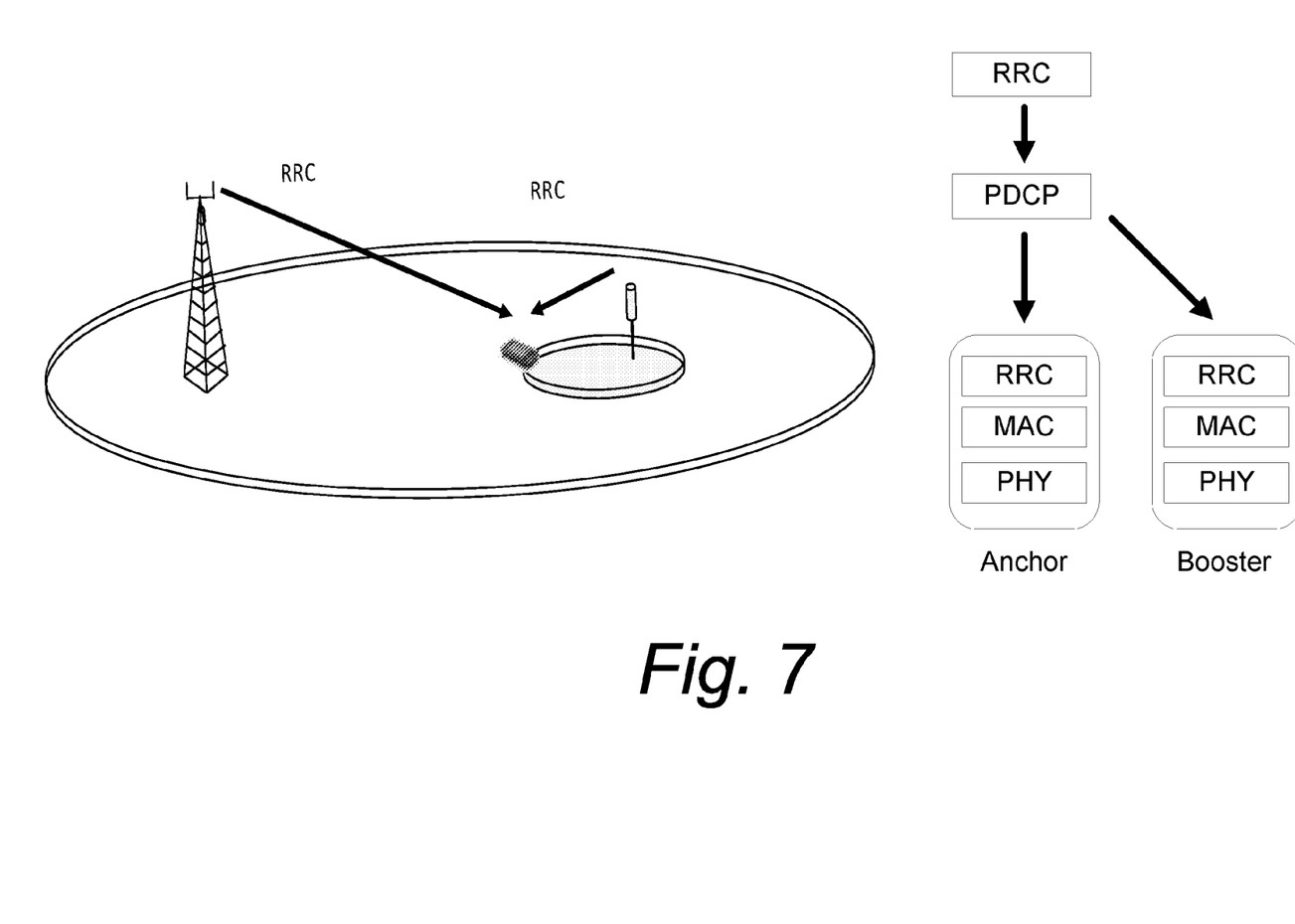
FIG. 7 is a diagrammatic view illustrating use of RRC diversity in a dual connectivity mode.

With RRC Diversity, RRC signaling messages may be communicated with the UE via both an anchor link and a booster link. It is assumed that the RRC and Packet Data Convergence Protocol (PDCP) termination point lies in the anchor node and thus signaling messages are routed as duplicate PDCP Payload Data Units (PDUs) also via the backhaul link between anchor and booster. On the UE side, duplicate PHysical Layer (PHY)/Medium Access Control (MAC)/Radio Link Control (RLC) instances are required, as illustrated in FIG. 7, and a separate RACH procedure to obtain time synchronization and Cell Radio Network Temporary Identity (CRNTI) for each link. As improved mobility robustness is one of the major arguments for dual connectivity, RRC diversity is an especially interesting feature for the transmission of handover related messages such as UE measurement reports and RRC-reconfiguration requests ("handover commands").

Figure 8:
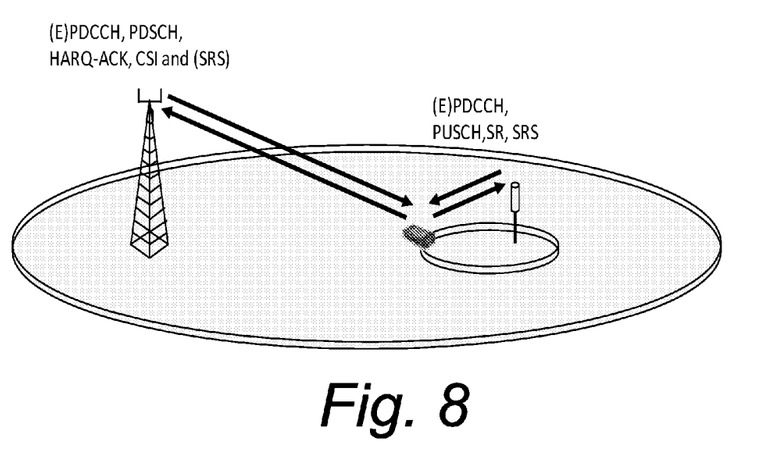
FIG. 8 is a diagrammatic view illustrating use of decoupled UL/DL in a dual connectivity mode.
Figure 9:
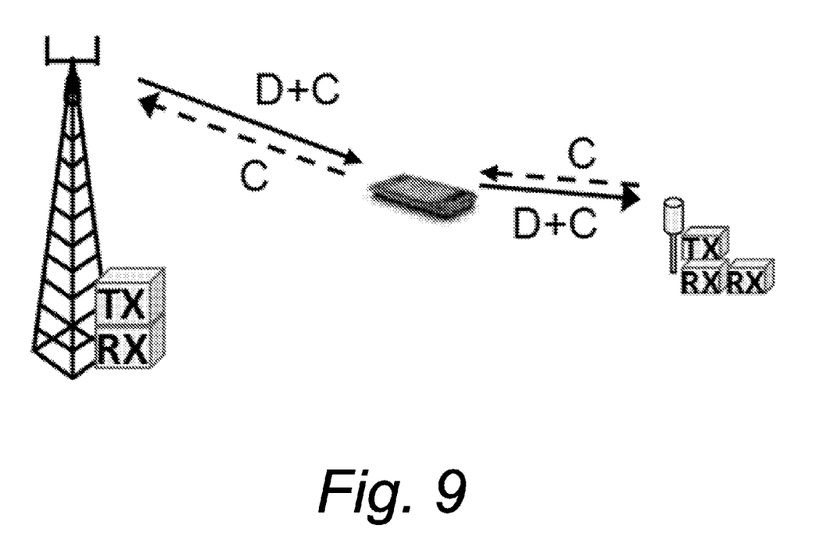
FIG. 9 is a diagrammatic view illustrating simultaneous UL transmission for a wireless terminal with dual connectivity.

A second useful scenario of dual connectivity is decoupled UL/DL. The main benefit with this feature is that it allows the UE to send UL transmission always to the point with lowest pathloss at the same time as it receives DL transmission from the network point with highest received power. This is useful when the UE is operating in a heterogeneous network with a macro cell and lower power nodes that have relatively large difference in transmission power, as illustrated in FIG. 8. The main deployment scenario studied is a scenario wherein the aggregated network nodes have a relaxed backhaul between them and the network nodes.

While dual connectivity, illustrated by way of example in FIG. 8, has some benefits, it remains to be solved how simultaneous uplink transmissions can be performed for UEs with dual connectivity. Both the UE behavior and the necessary signaling should be specified. This relates to several aspects such as node identification and association and UE behavior definition under different conditions, e.g. HARQ-ACK and periodic/aperiodic Channel State Information (CSI) multiplexing in case of simultaneous PUSCH/PUCCH transmissions, simultaneous SRS transmissions, etc. As an example, a downlink connection to a node therefore must be paired with an uplink connection (for HARQ-ACK+CSI) to the same node, and vice versa.

SUMMARY

In one of its aspects the technology disclosed herein concerns and/or involves a method performed by a wireless terminal operating with dual connectivity with a first node and a second node for simultaneous UL transmissions including PUSCH, PUCCH and SRS. The method comprises receiving information, from at least one of said nodes, via a communications interface of the wireless terminal, associating uplink transmissions to each node according to the received information, and applying a set of node specific parameters to the uplink transmissions associated with each node.

As one aspect of the technology disclosed herein, uplink transmissions associated with each node may be multiplexed together. The uplink transmissions associated with each node comprises multiplexing together at least two of the following transmissions; PUCCH, PUSCH and SRS.

According to another aspect of the method the information is a downlink control information message, which contains identification of each node. The information may also be a downlink control information contained in enhanced physical downlink control channel sets, wherein each set is configured to indicate its node association. Furthermore, the information may comprise two different Radio Network Temporary Identifiers, RNTIs, where each RNTI is associated with the set of node specific parameters. The RNTI may also be scrambled with different Cyclic Redundancy Check, CRC, masks, with each CRC mask being associated with the set of node specific parameters. The set of node specific parameters may comprise one or more of the following parameters; timing advance parameters, power control configuration parameters, CSI configuration parameters (measurement and reporting) and SRS configuration parameters. This method has the benefit of simplicity to handle simultaneous transmissions from a network perspective.

Yet another aspect of the technology disclosed herein relates to a wireless terminal for managing dual connectivity with a first node and a second node. The wireless terminal comprises a communications interface arranged to receive information from at least one of said nodes, a processor and a computer readable medium storing computer program code which, when run in the processor, causes the wireless terminal to associate uplink transmissions to each node according to the information received by the communications interface and apply a set of node specific parameters to the uplink transmissions associated with each node. The wireless terminal may further comprise a multiplexer configured to multiplex together the uplink transmissions associated with each node, such as at least two of the following node specific transmissions; PUCCH, PUSCH and SRS.

As a further aspect of the wireless terminal disclosed herein, the information is a downlink control information message, which contains identification of each node. The information may also be a downlink control information contained in enhanced physical downlink control channel sets, wherein each set is configured to indicate its node association. Furthermore, the information may comprise two different Radio Network Temporary Identifiers, RNTIs, where each RNTI is associated with the set of node specific parameters. The RNTI may also be scrambled with different Cyclic Redundancy Check, CRC, masks, with each CRC mask being associated with the set of node specific parameters. The set of node specific parameters may comprise one or more of the following parameters; timing advance parameters, power control configuration parameters, CSI configuration parameters (measurement and reporting) and SRS configuration parameters.

The advantage of the various aspects described above, i.e. associating uplink transmissions to each node based on the received information and applying a set of node specific parameters, is that it provides a simple solution for simultaneous UL transmissions for PUSCH, PUCCH and SRS for UEs operating with dual connectivity. Furthermore, by multiplexing together to the uplink transmissions it is possible to further enhance the uplink transmissions associated with each node.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, Digital Signal Processor (DSP) hardware, reduced instruction set processor, hardware (e.g., digital or analog) circuitry including but not limited to Application Specific Integrated Circuit(s) (ASIC), and/or Field Programmable Gate Array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The following terminologies may be used in the disclosure for consistency and simplicity. The technology described herein may apply to a heterogeneous network.

As used herein, the term "node" and/or "network node" may encompass nodes using any technology including, e.g., High Speed Packet Access (HSPA), LTE, Code Division Multiple Access (CDMA) 2000, GSM, etc. or a mixture of technologies such as with a Multi-Standard Radio (MSR) node (e.g., LTE/HSPA, GSM/HS/LTE, CDMA2000/LTE etc). Furthermore the technology described herein may apply to different types of nodes e.g., base station, eNode B, Node B, relay, base transceiver station (BTS), donor node serving a relay node (e.g., donor base station, donor Node B, donor eNB), supporting one or more radio access technologies.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Figure 10:
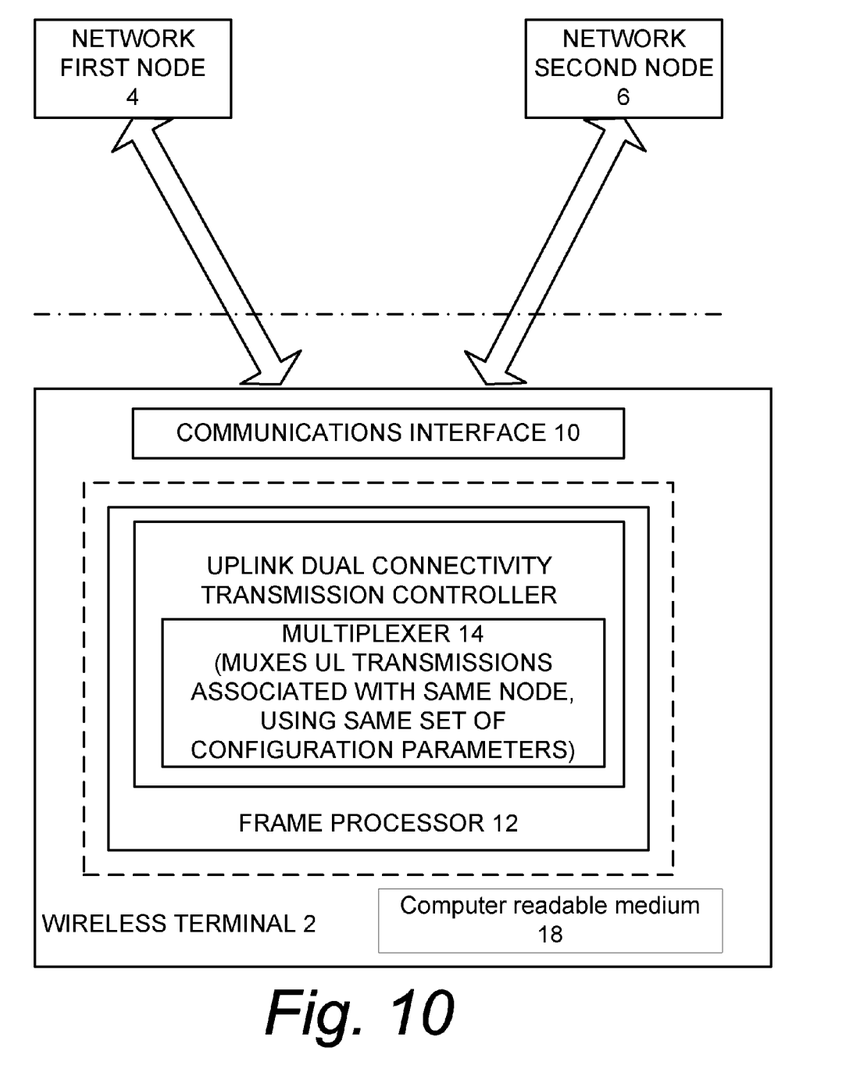
FIG. 10 is a diagrammatic view illustrating a wireless terminal configured for dual connectivity with two network nodes.

FIG. 10 shows portions of an example telecommunications network, and particularly two network nodes, e.g., first network node 4 and second network node 6. The first network node 4 and second network node 6 may or may not be members of a same radio access network. In a LTE context the first network node 4 and the second network node 6 may be base station nodes. In other contexts or other types of radio access networks, the first network node 4 and the second network node 6 may be a base station node or other type of node, such as a radio network controller (RNC) node, for example.

FIG. 10 further also shows a wireless terminal 2 which communicates over a radio or air interface (indicated by the dotted-dashed line) with the two network nodes 4, 6. The wireless terminal 2 comprises a communications interface 10 configured to facilitate communications over the radio interface between the wireless terminal 2 and the network nodes 4, 6, including dual connectivity wireless communications utilizing a radio frame structure. In the dual connectivity wireless communications transmissions occur essentially concurrently between the wireless terminal 2 and the plural network nodes 4, 6.

The wireless terminal 2 also comprises a processor 12, also known as a frame processor. The processor is configured to handle both uplink (UL) and downlink (DL) transmissions which are scheduled in the radio frame structure. The frame processor 12 comprises an uplink (UL) dual connectivity transmission controller. The UL dual connectivity transmission controller comprises a multiplexer 14. As explained herein, the multiplexer 14 serves to multiplex together the uplink (UL) transmissions associated with the same node, using a same set of configuration parameters.

For uplink (UL) purposes the radio frame structure may be described, at least in part, with reference to FIG. 4 and/or FIG. 5. As such the organization of the frame structure may be specified by one or more network nodes and expressed in one or more control channels of the radio frame, as previously explained. In accordance with such frame organization the frame processor 12 of the wireless terminal 2 receives signals and data in downlink (DL) transmissions of the frame structure and transmits appropriate signals and data in uplink (UL) transmissions of the frame structure, and does so for both network nodes 4, 6 when participating in dual connectivity operations.

Figure 11:
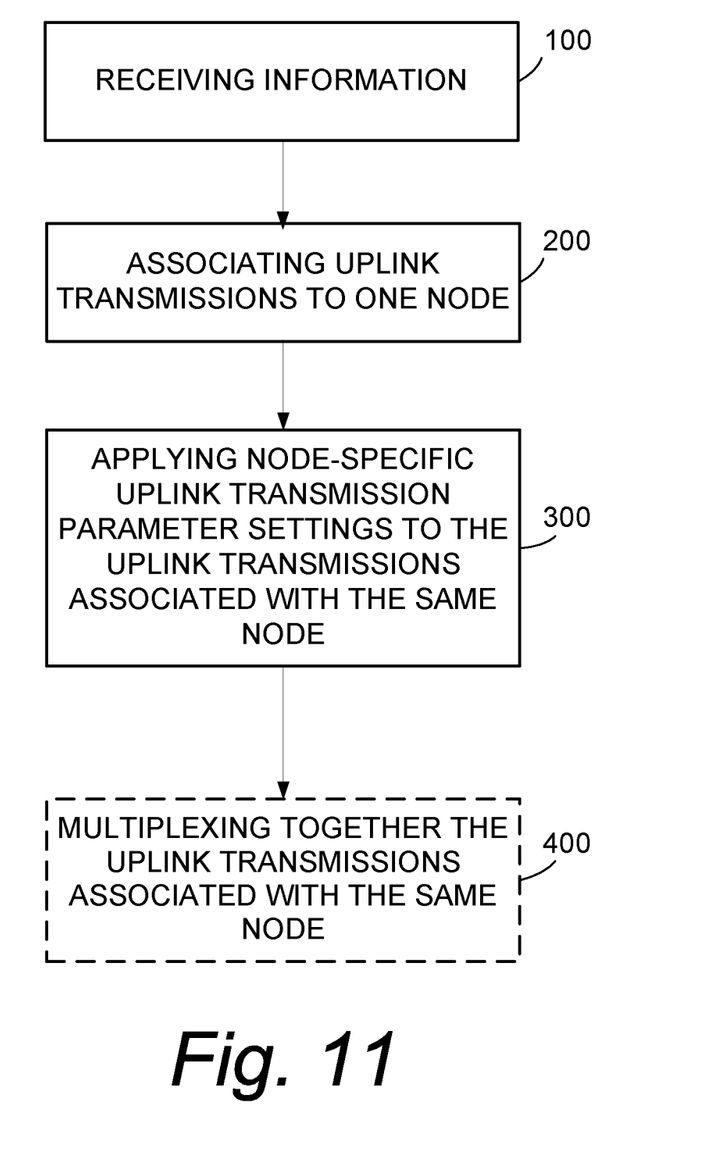
FIG. 11 is a flowchart depicting general, representative basic acts or steps that may be performed by a wireless terminal according to an example embodiment and mode.

FIG. 11 illustrates general, representative basic acts or steps that may be performed by the UL dual connectivity transmission controller of the processor 12 of the wireless terminal 2 according to an example embodiment and mode. In step 100 the wireless terminal 2 is receiving information, from at least one of said nodes 4, 6, via the communication interface 10 of the wireless terminal 2. In step 200 the wireless terminal 2 is associating uplink transmissions to each node according to the received information. In step 300 the wireless terminal 2 is applying a set of node specific parameters to the uplink transmissions associated with each node 4, 6. Thus, by performing these steps the wireless terminal 2 is capable of simultaneous uplink transmissions in dual connectivity mode. To further enhance uplink transmissions it is possible to, in an optional step 400, multiplexing together the uplink transmissions associated with each node 4, 6. Various ones of these acts/steps are elaborated hereinafter.

In differing embodiments the act of making the associating (200) to a node 4, 6 may be performed differently depending on the type of information received. In a first example embodiment, the information associating all uplink transmissions with one node is a UL or DL Downlink Control Information (DCI) message(s) which implicitly or explicitly contains the identification of the node. The DCI message transmits uplink or downlink scheduling information or an uplink Transmit Power Control (TPC) command. Depending on the purpose of control message, different DCI formats are defined. The information provided contains everything necessary for the wireless terminal to be able to identify the resources where to receive the Physical Downlink Data Channel (PDSCH) in that sub frame and to decode it. One implementation example of explicit methods is to add a new field in DCI indicating the ID of the node. Upon decoding the DCI, the wireless terminal 2 may acknowledge the connection. One other implementation example of implicit indications is to associate the DCI with an enhanced Physical Downlink Control Channel (ePDCCH) as will be explained below.

The uplink transmissions associated with the same node may as mentioned above be multiplexed together, and the set of node specific parameters may comprise one or more of the following parameters, Channel State Information (CSI) configuration parameters, e.g. CSI-RS configuration, CSI process, CSI-RS sub frame configuration and CSI sub frame set, timing advance parameters, power control configuration parameters and SRS configuration parameters including both periodic or aperiodic transmissions.

Another way to do the associating (200) to a node may as mentioned above be performed by associating the DCI with the ePDCCH. An index of ePDCCH sets can be configured to indicate the node association. The ePDCCH sets (e.g., a number of PRB pairs containing the DCI) may be configured by the eNB via higher layers after that the RRC connection is established, as explained in, e.g., section 9.1.4, 3GPP TS 36.213, V11.1.0 (2012 December), Technical Specification Group Radio Access Network; Evolved Universal Terrestrial Radio Access (E-UTRA); Physical layer procedures; (Release 11), e.g., section 9.1.4, which is incorporated herein by reference in its entirety. The association of the parameters and the ePDCCH set index may be predefined and signaled to the wireless terminal, e.g. set 1 is associated with node 1 and set 2 is associated with node 2. Therefore, upon decoding DCI in set 1, the wireless terminal could know that this DCI indicates the control information for node 1 and vice versa.

As an example, two ePDCCH sets could be configured for the wireless terminal 2, where each ePDCCH set is associated with one node. The ePDCCH set may be configured by higher layers to be associated with one set of node-specific configuration parameters. It is then possible also to extend this example to more than two nodes as well. Thus, in context of the present technology it is also possible to perform multi connectivity with more than two nodes.

Upon detection of the UL/DL DCIs within the corresponding ePDCCH set, the wireless terminal may apply the higher layer configured associated node specific parameters for the UL transmissions. For example, upon receiving aperiodic CSI trigger from a Macro node, the wireless terminal may report CSI corresponding to CSI-RS configurations using the corresponding timing advance and power control parameters on PUSCH for the Macro node. As another example, upon receiving aperiodic SRS trigger in an uplink grant from a Pico node, the wireless terminal transmits SRS according to the associated SRS configurations using the corresponding timing advance and power control parameters for the Pico node.

In another example embodiment the wireless terminal 2 may be configured to apply one set of node-specific parameters as mentioned above with that associated to a specific search space. Search space is a set of decoding candidates in the space of control channel elements (CCE or eCCE), as described, e.g., in section 9.1.4 of 3GPP TS 36.213 V11.1.0 (2012 December), incorporated herein by reference. For example, [0, 1, 2, 3] is a common search and [4, 5, 6, 7] is a UE-specific search space. The wireless terminal 2 or UE will attempt to blindly decode the DCIs in both search spaces. In an example the UE may be configured with a single common search space that is associated with a certain set of node specific parameters and then a corresponding UE specific search space for each node that the UE is connected to. Therefore, whether the decoded DCI is in the common search space or the UE-specific search space, the UE could acknowledge its connection implicitly. It may also be foreseen that the wireless terminal may receive a common search space from several nodes. Separate handling could be done upon receiving UL/DL DCIs belonging to the given search space. In case the wireless terminal-specific search spaces from different nodes collide either in the logical domain or physical RE mapping, a certain wireless terminal specific search or part of the search space can be prioritized in the sense that it will be the only search space the wireless terminal will receive in this case. The prioritization can be done by for example one of the following examples Node type, e.g. an Anchor node may have higher priority then an booster Physical cell id number or serving cell index In another example the information received by the wireless terminal may comprise two different Radio Network Temporary Identifiers (RNTIs), where each is associated with a set of node specific parameters as described in the above embodiment. In this regard it is mentioned that dual connectivity is not restricted to one DL with one node and one UL with another. The UE could receive/transmit from/to two nodes, both UL and DL with each node, although not necessarily at the same time. RNTI is an ID used by the eNB to differentiate the wireless terminals. RNTI is usually scrambled with CRC in DCI. In dual connectivity, the wireless terminal should have the capability to identify the connection. The solution described here is to assign the wireless terminal with two RNTIs and associate each connection with one RNTI. Upon decoding whether the DCI is scrambled by which RNTI, the UE could know with which node it is communicating. Separate handling may be done upon receiving UL/DL DCIs scrambled with different RNTIs.

In another example embodiment one RNTI may be scrambled with different Cyclical Redundancy Check (CRC) masks, where each CRC mask is associated with a set of node specific parameter as described in the above embodiment. Similar as above, upon decoding whether the DCI is scrambled by which CRC mask, the wireless terminal may know with which node it is communicating. Similarly, separate handling could be done upon receiving UL/DL DCIs with different CRC masks.

In another example embodiment the wireless terminal may be configured with a new "Connection indicator field" in the DCI. The field explicitly indicates which link shall be associated for the corresponding transmission.

In an embodiment the DCI message, that the eNB transmits to eNB scrambling, includes a parameter identifying which set of node specific parameters the UE should use for the corresponding DL reception and HARQ feedback or UL transmission. The parameter may be, for example, the Physical cell ID or the Serving Cell index. The node association configuration can be done either after the random access or when a handover happens.

As indicated above, step 400 comprises multiplexing together the uplink transmissions associated with the same node. In other words, in an example embodiment, all PUCCH/PUSCH transmissions (implicitly or explicitly)

associated with one of the nodes shall be multiplexed together, where the same set of uplink transmission parameter settings shall be applied.

Figure 12:
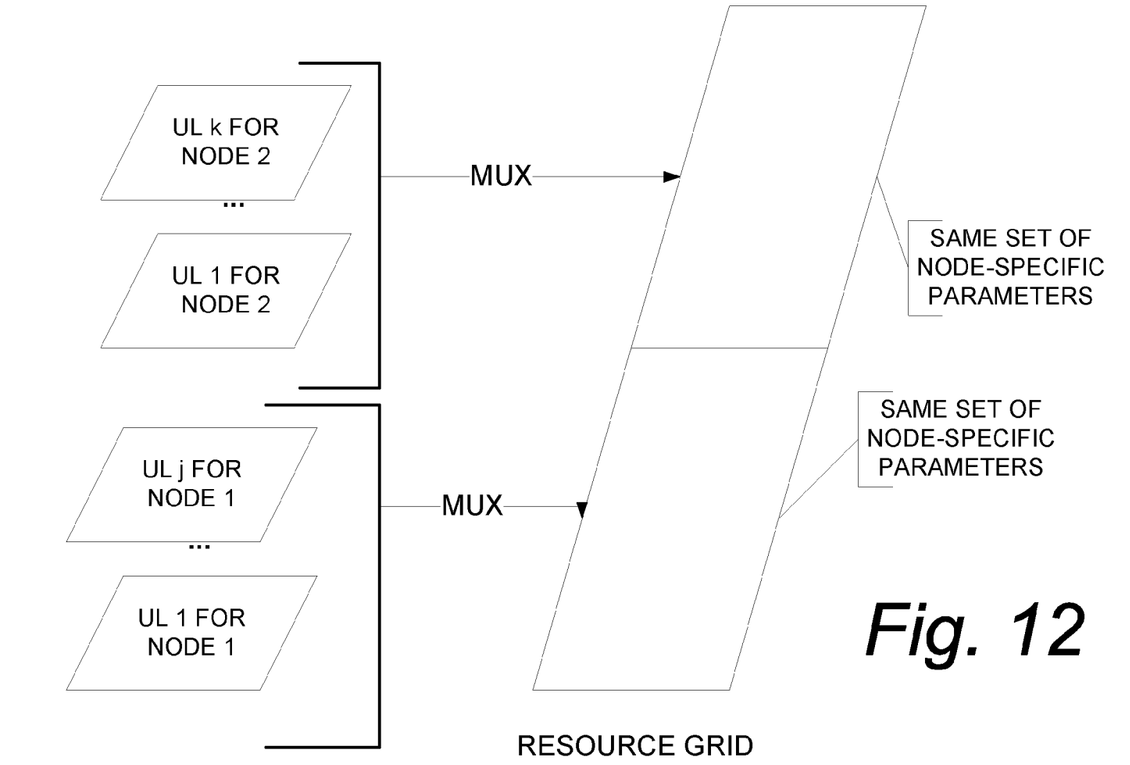
FIG. 12 is a diagrammatic view illustrating acts of multiplexing together plural uplink transmissions destined to a first node and multiplexing together plural uplink transmissions destined to a second node.

FIG. 12 illustrates, in generic fashion, how uplink (UL) transmissions to a first node may be multiplexed and transmitted together, while uplink (UL) transmissions to a second node may be multiplexed and transmitted together. The two connections may be in the same sub frame or different sub frames (e.g., time domain multiplexing). If the dual connection happens in the same sub frame, they should preferably be separated in the frequency domain.

In handing uplink (UL) transmissions toward two network nodes, the steps in FIG. 11 may be executed with respect to both uplinks, e.g., with respect to both network nodes 4, 6.

Various non-limiting examples of implementations of multiplexing 400 together the uplink transmissions associated with each node are described below. As a first example implementation, in case two simultaneous PUSCH transmissions are triggered from two different nodes, each PUSCH should be transmitted using (a different) one set of the higher layer configured node specific parameters.

As another example implementation of multiplexing 400, in case HARQ-ACK and one aperiodic CSI is triggered toward one node and at the same time one PUSCH is scheduled to be transmitted toward another node, the HARQ-ACK and the aperiodic CSI should be multiplexed together and transmitted on PUSCH using higher layer configured parameters associated with that node. The other PUSCH should be transmitted also on PUSCH using the other set of higher layer configured node specific parameters.

As another example implementation of multiplexing 400, in case of simultaneous transmission of HARQ-ACK and periodic CSI for one node and PUSCH transmission for the other node, if simultaneous transmission of PUCCH and PUSCH is not allowed, the wireless terminal may multiplex the HARQ-ACK and the periodic CSI together and transmit on its corresponding PUSCH using higher layer configured parameters associated with that node. The other PUSCH may be transmitted using the other set of higher layer configured node specific parameters.

As another example implementation of multiplexing 400, in case of simultaneous transmission of HARQ-ACK and periodic CSI for one node and PUSCH transmission for the other node, if simultaneous transmission of PUCCH and PUSCH is allowed, the wireless terminal may either multiplex the HARQ-ACK and the periodic CSI together or transmit separately on PUCCH using higher layer configured parameters associated with that node. The other PUSCH may be transmitted using the other set of higher layer configured node specific parameters.

As another example implementation of multiplexing 400, in case of simultaneous transmission of HARQ-ACK and periodic CSI for two nodes, the wireless terminal may transmit PUCCH simultaneously, the HARQ-ACK and periodic CSI for each node will be either multiplexed together or transmit separately on PUCCH using higher layer configured parameters associated with that node.

As a further embodiment, it is preferred that the PUCCH resources for each node can be coordinated so that the interferences between simultaneous transmissions can be avoided.

Figure 13:
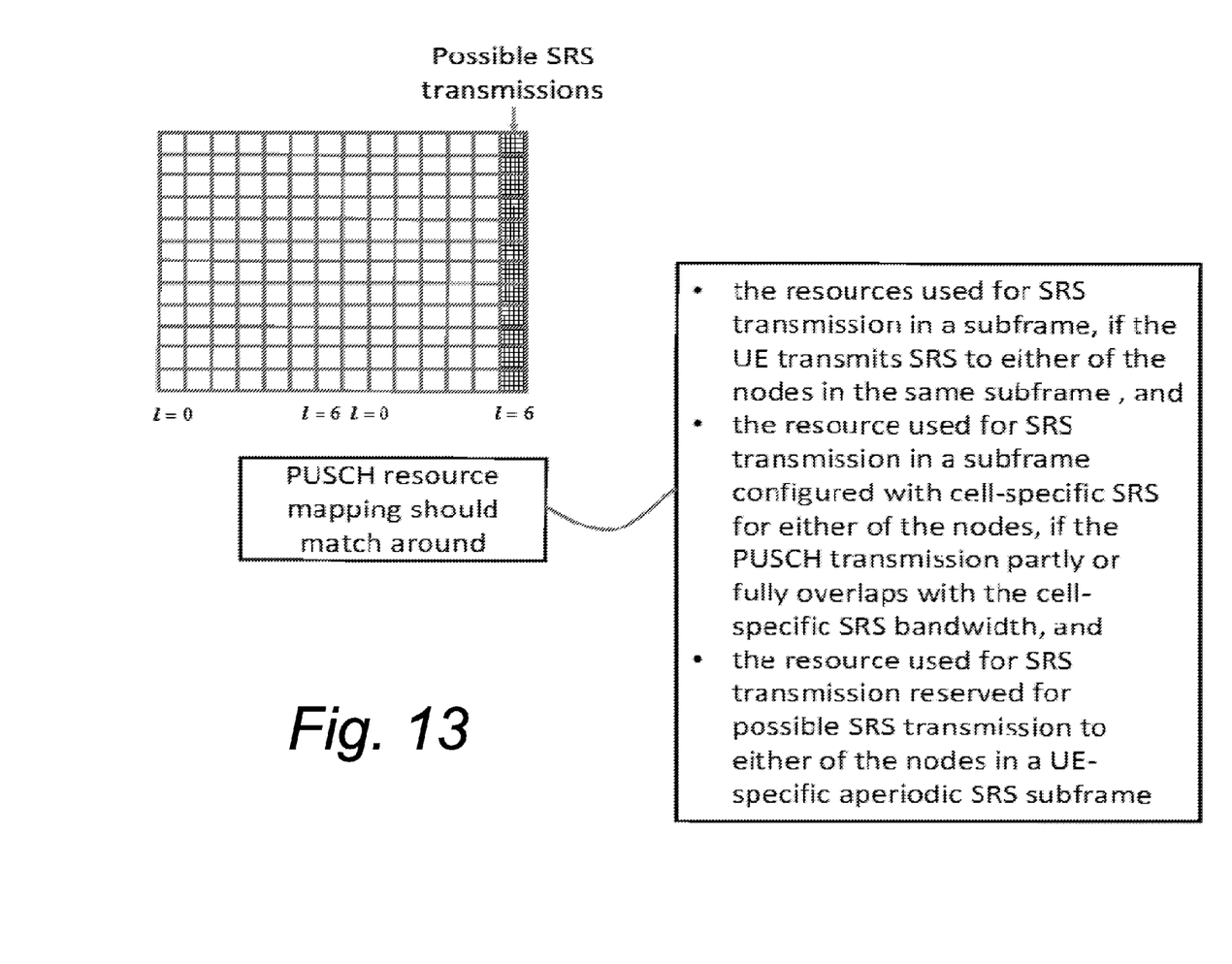
FIG. 13 is a diagrammatic view illustrating PUSCH resource mapping in a case of SRS transmission.

In one example embodiment, SRS transmissions implicitly or explicitly associated with one of the nodes may be transmitted with one set of node specific SRS configurations. In another example embodiment, the resources for PUSCH may puncture.

the resources used for SRS transmission in a sub frame, if the UE transmits SRS to either of the nodes in the same sub frame, and the resource used for SRS transmission in a sub frame configured with cell-specific SRS for either of the nodes, if the PUSCH transmission partly or fully overlaps with the cell-specific SRS bandwidth, and the resource used for SRS transmission reserved for possible SRS transmission to either of the nodes in a UE-specific aperiodic SRS sub frame "Puncturing" here is related to the PUSCH resource mapping. When one resource element is punctured, it means the modulated symbol should not be mapped on that resource element. FIG. 13 illustrates PUSCH resource mapping in a case of SRS transmission. In case of simultaneous transmission of SRS and PUCCH, the resources for PUCCH puncture the resource used for SRS transmission to either of the nodes.

As used herein, "terminal" or "wireless terminal" or "user equipment (UE)" may be a mobile station such as a mobile telephone or "cellular" telephone or a laptop with wireless capability, e.g., mobile termination, and thus may be, for example, a portable, pocket, hand-held, computer-included, or car-mounted mobile device which communicates voice and/or data via a radio access network. Moreover, a terminal or wireless terminal or UE may be a fixed terminal which communicates voice and/or data via a radio access network.

In example embodiments described herein or otherwise encompassed hereby, various elements or units which are bounded or enclosed by broken lines, such as the frame processors described herein, may be realized by a machine platform. The terminology "machine platform" is a way of describing how the functional units may be implemented or realized by machine. The machine platform can take any of several forms, such as (for example) electronic circuitry in the form of a computer implementation platform or a hardware circuit platform. A computer implementation of the machine platform may be realized by or implemented as one or more computer processors or controllers as those terms are herein expansively defined, and which may execute instructions stored on non-transient computer-readable storage media. In such a computer implementation the machine platform may comprise, in addition to a processor(s), a memory section (which in turn can comprise random access memory; read only memory; an application memory (a non-transitory computer readable medium which stores, e.g., coded non instructions which can be executed by the processor to perform acts described herein); and any other memory such as cache memory, for example). Another example platform suitable is that of a hardware circuit, e.g., an application specific integrated circuit (ASIC) wherein circuit elements are structured and operated to perform the various acts described herein.

The technology disclosed thus encompasses the following non-limiting example embodiments:

Example Embodiment E1

A wireless terminal comprising:
a communications interface configured to facilitate communications over a radio interface between the wireless terminal and plural network nodes, including dual connectivity wireless communications comprising a frame structure whereby transmissions occur essentially concurrently between the wireless terminal and the plural network nodes;
a processor configured to multiplex uplink transmissions associated with a same node and transmit the multiplexed uplink transmissions associated with the same node using a same set of configuration parameters.

Example Embodiment E1.1

The wireless terminal of Example Embodiment E1, wherein the set of configuration parameters is configured by signaling of a layer higher than a frame structure handled by the processor.

Example Embodiment M1

A method in a wireless terminal comprising:
associating uplink transmissions to one node;
applying node-specific uplink transmission parameter settings to the uplink transmissions associated with the same node;
multiplexing together the uplink transmissions associated with the same node.

Example Embodiment M1.1

The method of Example Embodiment M1, wherein associating uplink transmissions to the one node comprises making an association of the uplink transmissions based on at least one of the following:
downlink Control Information (DCI) message(s) which implicitly or explicitly contains the identification of the node;
an index of enhanced Physical Downlink Control Channel (ePDCCH) sets what has been configured to indicate the node association;
a specific search space, the search space comprising a set of decoding candidates in the space of control channel elements;
two different RNTIs, where each RNTI is associated with a set of node specific parameter;
one RNTI scrambled with different CRC masks, where each CRC mask is associated with a set of node specific parameter; and
a new Connection indicator field in DCI which explicitly indicates which link shall be associated for the corresponding transmission.

The following is a list of non-exhaustive, example Abbreviations which may appear herein:
The following is a list of non-exhaustive, example Abbreviations which may appear herein:
BLER Block Error Rate
BS Base Station
CID Cell Identity
CRC Cyclical Redundancy Check
CRS Cell-specific Reference Signal
CSI Channel state information
CSR Channel status report
CQI Channel Quality Indicator
ePDCCH enhanced Physical Downlink Control Channel
DFT Discrete Fourier Transform
DL Downlink
HARQ Hybrid ARQ
ID Identity
L1 Layer 1
L2 Layer 2
LTE Long Term Evolution
MAC Medium Access Control
MIMO Multiple-Input, Multiple-Output
OFDM Orthogonal Frequency Division Multiplexing
PDCCH Physical Downlink Control Channel
PDSCH Physical Downlink Shared Channel
PUCCH Physical Uplink Control Channel
PDSCH Physical downlink shared channel
PHR Power Headroom Reporting
PRB Physical Resource Block
PSS Primary Synchronization Signal
RAT Radio Access Technology
RE Resource Element
RB Resource Block
RNTI Radio Network Temporary Identifier
RRM Radio Resource Management
SRS Sounding Reference Signal
SSS Secondary Synchronization Signal
SC-FDMA Single Carrier-Frequency Division Multiple Access
UE User Equipment
UL Uplink
TPC Transmit Power Control The following is a list of non-exhaustive, example References which may be pertinent:
[1] 3GPP TS 36.211 "Evolved Universal Terrestrial Radio Access (E-UTRA); Physical channels and modulation".
[2] 3GPP TS 36.331 "Evolved Universal Terrestrial Radio Access (E-UTRA); Radio Resource Control (RRC); Protocol specification".

Although the description above contains many specifics, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

The invention claimed is:

1. A method performed by a wireless terminal operating with dual connectivity with a first node and a second node, the method comprising:
receiving information, from at least one of the first node and the second node, via a communications interface of the wireless terminal,
associating uplink transmissions to each of the first node and the second node according to the received information,
applying a set of node specific parameters to the uplink transmissions associated with each of the first node and the second node; and
multiplexing together the uplink transmissions associated with each of the first node and the second node, wherein the uplink transmissions are multiplexed within a same subframe and wherein the set of node specific parameters comprises one or more of the following parameters:
Channel State Information (CSI) configuration parameters,
timing advance parameters,
power control configuration parameters, and Sounding Reference Signal (SRS) configuration parameters.

2. The method according to claim 1, wherein multiplexing together uplink transmissions associated with each of the first node and the second node comprises multiplexing together at least two of the following transmissions:
   Physical Uplink Control Channel (PUCCH),
   Physical Uplink Shared CHannel (PUSCH), and
   Sounding Reference Signal (SRS).

3. The method according to claim 1, wherein the information is a Downlink Control Information (DCI) message, which contains identification of each of the first node and the second node.

4. The method according to claim 1, wherein the information being a Downlink Control Information message, is contained in enhanced Physical Downlink Control Channel (ePDCCH) sets, each ePDCCH set being configured to indicate anode association.

5. The method according to claim 1, wherein the information comprises two different Radio Network Temporary Identifiers (RNTIs), and wherein each RNTI is associated with the set of node specific parameters.

6. The method according to claim 5, wherein one RNTI is scrambled with different Cyclic Redundancy Check (CRC) masks, each CRC mask being associated with the set of node specific parameters.

7. A wireless terminal for managing dual connectivity with a first node and a second node, the wireless terminal comprising:
   a communications interface arranged to receive information from at least one of the first node and the second node;
   a processor; and a computer readable medium storing computer program code which, when run in the processor, causes the wireless terminal to:
   associate uplink transmissions to each of the first node and the second node according to the information received by the communications interface,
   apply a set of node specific parameters to the uplink transmissions associated with each of the first node and the second node; and a multiplexer configured to multiplex together the uplink transmissions associated with each of the first node and the second node, wherein the uplink transmissions are multiplexed within the same subframe,
   wherein the wireless terminal is configured to use one or more of the following parameters as the set of node specific parameters:
   Channel State Information (CSI) configuration parameters,
   timing advance parameters,
   power control configuration parameters, and
   Sounding Reference Signal (SRS) configuration parameters.

8. The wireless terminal according to claim 7, further configured to multiplex together at least two of the following node specific transmissions,
   Physical Uplink Control Channel, PUCCH
   Physical Uplink Shared Channel (PUSCH), and
   Sounding Reference Signal, (SRS).

9. The wireless terminal according to claim 7, wherein the information is a Downlink Control Information (DCI) message, which contains identification of each of the first node and the second node.

10. The wireless terminal according to claim 7, wherein the information being a Downlink Control Information, is contained in enhanced Physical Downlink Control Channel (ePDCCH) sets, each ePDCCH set is configured to indicate a node association.

11. The wireless terminal according to claim 7, wherein the information comprises two different Radio Network Temporary Identifiers (RNTIs), and wherein each RNTI is associated with the set of node specific parameters.

12. The wireless terminal according to claim 11, wherein the wireless terminal is configured to scramble one RNTI with different Cyclic Redundancy Check (CRC) masks, each CRC mask being associated with the set of node specific parameters.

* * * * *